March 10, 1931.    H. J. WHITE    1,795,629
REVERSING MECHANISM
Filed Dec. 27, 1928
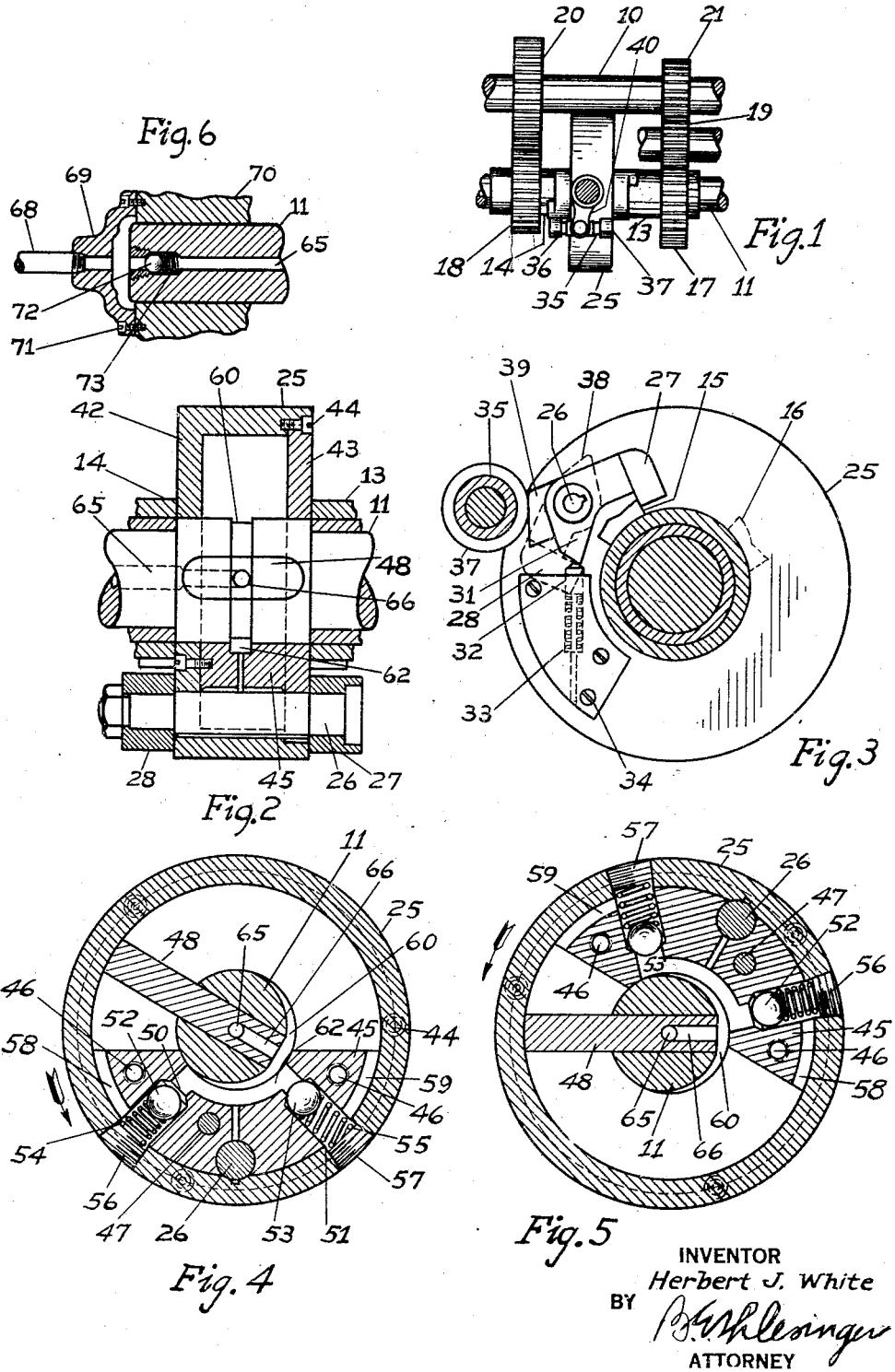
INVENTOR
Herbert J. White
BY
B. Schlesinger
ATTORNEY Patented Mar. 10, 1931

1,795,629

UNITED STATES PATENT OFFICE

HERBERT J. WHITE, OF ROCHESTER, NEW YORK, ASSIGNOR TO GLEASON WORKS, OF ROCHESTER, NEW YORK, A CORPORATION OF NEW YORK

REVERSING MECHANISM

Application filed December 27, 1928. Serial No. 328,631.

The present invention relates to reversing mechanism, particularly to the type of reversing mechanism employed in machine tools where it is desired to quickly reverse the direction of rotation of a shaft traveling at a comparatively high speed.

Among the purposes of the invention are to eliminate the noise occasioned by the sudden disengagement of the means driving the shaft in one direction and the sudden engagement with the shaft of means for driving it in the opposite direction, to reduce the possibility of breakage occasioned by the sudden engagement of either driving member with the rotating shaft, and to reduce to a minimum the shock imparted to the shaft and the parts actuated thereby by its sudden reversal while traveling at a high speed. This last feature is of particular value when the reversing mechanism of the present invention is applied to gear cutting machines, one field in which this invention will be found especially useful. A better tooth surface finish can be obtained through the use of the present reversing mechanism even at higher speeds.

A preferred embodiment of the invention is illustrated in the accompanying drawings in which:

Figure 1 is a view illustrating a usual arrangement of gearing for driving a shaft alternately in opposite directions and showing the application of my invention thereto;

Figure 2 is a section on an enlarged scale through the driven shaft and reverse drum;

Figure 3 is a side elevation of the parts shown in Figure 2;

Figures 4 and 5 are sections through the driven shaft and reverse drum taken at right angles to the section of Figure 2 and showing two different positions of the reverse drum and shaft; and Figure 6 is a detail view showing a section taken through the outer end of the driven shaft and its bearing, showing the means for maintaining the supply of liquid in the drum.

Referring to the drawings by numerals of reference, 10 indicates a driving shaft and 11 the driven shaft. Journaled on the driven shaft 11 is a pair of sleeves 13 and 14, respectively. These sleeves are provided, respectively, with oppositely directed lugs or projections 15 and 16. To each of the sleeves 13 and 14 is secured a gear, the gear 17 on the sleeve 13 being driven through the intermediate gear 19 meshing with the gear 21 on the shaft 10, while the gear 18 on the sleeve 14 is rotated directly from the shaft 10 by the gear 20. Through this arrangement, it will be seen that the sleeves 13 and 14 are driven simultaneously in opposite directions.

Journaled on the shaft 11 is a hollow drum 25. Journaled in the drum 25 is an oscillatory pin or stud 26. To this stud or pin 26, at opposite ends thereof, are secured the dogs 27 and 28. The dogs are oppositely directed for engagement, respectively, with the oppositely disposed lugs 15 and 16 on the sleeves 13 and 14. The dog 27 is provided with a notched or V-shaped tail piece 31 with which cooperates a spring actuated pin or plunger 32 to normally hold the dogs in the position shown in Figure 3 with both disengaged from their respective lugs. It will be understood, of course, that the two dogs 27 and 28 move together being both secured to the stud 26. The plunger 32 is suitably housed in a piece 33 secured by screws 34 to one side of the drum casing 25.

The dogs 27 and 28 are engaged alternately with their respective lugs 15 and 16 by the shifting of a rod 35 which is provided at opposite ends with collars 36 and 37. These collars 36 and 37 are adapted to engage, respectively, the lugs 38 and 39, formed on the tail pieces of the dogs 28 and 27, respectively.

In the position shown in Figure 1, the collar 36 is in position to engage the tail piece 38 of the dog 28, thus disengaging the dog 28 from its lug 16 and forcing the dog 27 into engagement with its lug 15 against the action of the spring pressed plunger 32. This causes the drum 25 to be rotated by the gearing 21, 19, 17. When the rod 35 is shifted to the right from the position shown in Figure 1, the collar 37 will engage the lug 39 formed on the tail piece of the dog 27 to rock this dog 27 out of engagement with its lug 15 and simultaneously engage the other dog 28 with its lug 16. The drum 25 will then be driven in the reverse direction through the gearing 20 and 18.

The rod 35 may be shifted by a yoke or rocker arm 40 which may be actuated to shift the rod alternately in opposite directions by means of a cam incorporated in the machine in which the reverse mechanism is employed.

The drum 25 itself is hollow and is adapted to contain a fluid, preferably oil.

The drum is made in two parts, a cup-shaped member 42 and a cover plate 43. The cover plate 43 is secured to the cup-shaped part 42 by means of screws 44. Integral with the cover plate is a substantially semi-circular block 45 which extends into the drum chamber. The inner face of this block 45 is curved to fit closely the shaft 11. The inside wall of this block 45 has a close substantially fluid-tight fit with the inside wall of the drum formed by the bottom of the cup-shaped part 42, when the drum is assembled. Screws 46 which connect the cup-shaped part 42 with the block 45 serve to hold the parts together more securely, while a dowel pin 47 may also be provided to prevent relative rotation between the two parts of the drum.

The shaft 11 is slotted transversely where it extends within the drum chamber and within this slot is secured a paddle or arm 48. This paddle or arm 48 is preferably so made that is has a substantially fluid-tight contact with the side walls and the inside peripheral surface of the drum.

The block 45 is radially bored at 50 and 51 to receive a pair of check valves. These valves are of the ball type comprising a pair of balls 52 and 53 which are constantly urged into closed position by the springs 54 and 55. Nuts 56 and 57 which are threaded into the drum casing may be adjusted to adjust the tension on the springs. The block 45 is grooved at 58 and 59 to provide ducts for conducting the fluid in the drum chamber to corresponding sides of the balls 52 and 53 to seat the balls more securely on rotation of the drum in opposite directions.

The shaft 11 is provided with a peripheral groove 60 within the drum chamber which extends over halfway around the shaft. This groove 60 is of crescent-shape, that is, the bottom of the groove is eccentric of the axis of the shaft. The block 45 is grooved between its ends, as at 62. The groove 62 opens on to the periphery of the shaft 11 and communicates with the groove 60 in that shaft during the rotation of the drum on the shaft.

The operation of the mechanism described is as follows: Assuming the drum to have been driving the shaft in a direction opposite to that indicated by the arrow in Figure 4, when rod 35 is shifted, the drum is rotated in the direction of the arrow. As the drum rotates in this direction, the oil in the chamber is entrapped between the block 45 and the paddle 48. Part of this oil escapes into the passage 59 to seal the ball-valve 53; part of it flows through the groove 60 in the shaft into the groove 62 in the block 45 forcing the ball-valve 52 open so that the oil may flow out of the duct 58 to the opposite side of the block 45. Due to the crescent shape of the slot 60, the amount of oil which can flow into the groove 62 is gradually diminished. The slot 60 shown in the drawings is so formed that when the block 45 reaches the position shown in Figure 5 by continued rotation of the drum in the direction of the arrow, the flow of oil through the duct 62 is shut off entirely. The drum now starts to drive the shaft through the head of oil confined between the block 45 and the paddle or arm 48. If desired, however, the groove 60 may be of such extent that the block 45 can actually come into engagement with the paddle, but, of course, because of the eccentric form of the groove this engagement is an engagement at a reduced speed and without shock. The drum continues to drive the shaft in the direction indicated by the arrow until the rod 35 is again shifted when the drum will be rotated in the opposite direction. The shaft will remain stationary until the block has traveled to a position diametrically opposite to that shown in Fig. 5 against the resistance of the oil, when the drum will again drive the shaft. In this movement of the block from the position shown in Figure 5 to a driving position diametrically opposite thereto, the oil confined between the block and the paddle will flow into the duct 58 to seat the valve 52 and will flow through the groove 60 into the groove 62 to open the valve 53 whence it flows by means of the duct 59 into the pocket behind the traveling block.

It will be seen, then, that with the mechanism of this invention when reversal takes place, the initial action is simply to reverse the rotation of the drum and not that of the shaft and the whole load, that the drum when reversed has to travel through an appreciable angular distance against the resistance of the fluid in the drum chamber before the shaft can be picked up and driven in the reverse direction and that during this angular travel of the drum, the speed of the drum is gradually reduced by the resistance of the oil so that when it reaches driving position it is travelling at a speed to pick up the shaft and the load without shock or jar. The operation of reversal, then, is quiet and vibrationless.

To maintain the volume of oil in the drum, the shaft 11 is drilled from one end to provide a duct as indicated at 65. This duct 65 communicates within the drum chamber with a slot 66 formed in the arm or paddle 48 and extending into the groove 60 cut in the shaft. At its outer end the oil is pumped into the duct 65 from the oil pump on the machine through the pipe 68. This pipe 68 is threaded into a cap 69 that is secured to the bearing 70 for the shaft 11 by screws 71. A check valve is provided in the shaft 65 adjacent the pipe. This check valve comprises a ball 72 which is constantly urged into closed position by the spring 73. The tension on the spring is sufficient to prevent the valve from opening until the amount of oil in the drum has fallen below the working volume. Thus, means is provided for automatically maintaining a desired volume of oil in the drum.

While I have described my invention in connection with a particular embodiment, it is understood that it is capable of various further modifications. In general, it may be said that this application is intended to cover any variations, uses, or adaptations of the invention, following, in general, the principles of the invention and including such departures from the present disclosure as come within known or customary practice in the art to which the invention pertains and as may be applied to the essential features set forth and as fall within the scope of the invention or the limits of the appended claims.

Having thus described my invention, what I claim is:

1. In a reverse mechanism, a rotatable shaft, a drum rotatably mounted on the shaft, said drum being hollow and containing a liquid, means for driving one of said rotatable members in opposite directions, an arm secured to the shaft and a block secured to said drum, each of which projects into the drum chamber to an extent to entrap liquid therebetween on movement of the drum and shaft relatively to each other in either direction, one of said parts being provided with a crescent shape passage-way for conducting fluid to opposite sides of the arm and block on relative rotation between the drum and shaft, whereby on such relative rotation, the flow of liquid is gradually decreased to cause the drum and shaft to come gradually into driving engagement.

2. In a reverse mechanism, a rotatable shaft, a drum rotatably mounted on said shaft, said drum being hollow and containing a liquid, means for driving one of said rotatable members in opposite directions, an arm secured to the shaft and a block secured to said drum, each of which projects into the drum chamber to an extent to entrap liquid therebetween on rotation of the drum and shaft relatively to each other in either direction, a pair of check valves mounted in the block, said block being provided with ducts for conducting liquid in the chamber to opposite sides of each of said valves, whereby in the relative rotation of drum and shaft in either direction one of the valves is closed and the other is opened to permit regulated flow of the entrapped liquid from between the arm and block to bring the drum and shaft gradually into driving engagement.

3. In a reverse mechanism, a rotatable shaft, a drum rotatably mounted on the shaft, said drum being hollow and containing a liquid, means for driving one of said members in opposite directions, an arm secured to said shaft and a block secured to said drum, each of which projects into the drum chamber to an extent to entrap liquid therebetween on movement of the drum and shaft relatively to each other in either direction, said block being provided with an arcuate surface closely fitting said shaft, and said arm being curved at its outer end to closely fit the internal surface of the drum, said shaft being slotted on its periphery to provide a crescent shaped groove, a pair of check valves mounted in the block, said block being provided with ducts for conducting liquid in the chamber for conducting liquid from said groove to corresponding sides of said valves and being further provided with ducts for conducting liquid from said chamber to the opposite side of each of the valves whereby in the relative rotation of the drum and shaft in either direction, one of the valves is closed and the other is opened to permit gradually decreased flow of the entrapped liquid from between the arm and block to cause the drum and shaft to come gradually into driving engagement.

4. In a reverse mechanism, a rotatable shaft and a drum rotatably mounted on the shaft one of which is driven in opposite directions, said drum being hollow and containing a liquid, an arm secured to the shaft and a block secured to the drum, each of which projects into the drum chamber, said block being provided with an arcuate surface closely fitting said shaft and said arm being curved at its outer end to closely fit the internal surface of the drum, one of said parts being provided with a crescent shaped groove to permit gradually decreased flow of the liquid entrapped between the arm and block from one side of the block to the other, in the relative movement of shaft and drum, and means for automatically maintaining the supply of liquid in said drum.

5. In a reverse mechanism, a rotatable shaft and a drum rotatably mounted on the shaft, one of said parts being driven in opposite directions, said drum being hollow and adapted to contain a liquid, a member secured to the drum projecting into the chamber thereof and extending from one side thereof to the other partway around the drum chamber to form a partition wall therein, an arm secured to the shaft projecting into the chamber and extending from one side thereof to the other to form, also, a partition wall in the chamber and a groove in one of said parts for passage of liquid from one side to the other of the partitions in the relative rotational movement of the shaft and drum during reversal.

HERBERT J. WHITE.